United States Patent
Maruta et al.

(10) Patent No.: US 8,902,789 B2
(45) Date of Patent: Dec. 2, 2014

(54) NETWORK MANAGEMENT SYSTEM AND INTERNETWORKING UNIT

(75) Inventors: Satoshi Maruta, Kodaira (JP); Yoshihiro Kawashima, Musashimurayama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 157 days.

(21) Appl. No.: 13/583,669

(22) PCT Filed: Feb. 23, 2011

(86) PCT No.: PCT/JP2011/053932
§ 371 (c)(1),
(2), (4) Date: Nov. 20, 2012

(87) PCT Pub. No.: WO2011/118320
PCT Pub. Date: Sep. 29, 2011

(65) Prior Publication Data
US 2013/0058253 A1 Mar. 7, 2013

(30) Foreign Application Priority Data
Mar. 26, 2010 (JP) ................................. 2010-073440

(51) Int. Cl.
*H04L 12/28* (2006.01)
*H04L 12/54* (2013.01)
*H04L 12/46* (2006.01)
*H04L 29/08* (2006.01)
*H04L 29/12* (2006.01)

(52) U.S. Cl.
CPC ............ *H04L 12/4625* (2013.01); *H04L 12/56* (2013.01); *H04L 61/103* (2013.01); *H04L 61/2535* (2013.01); *Y02B 60/43* (2013.01); *H04L 67/12* (2013.01)
USPC ......................................... 370/254; 370/401

(58) Field of Classification Search
None
See application file for complete search history.

(56) References Cited

U.S. PATENT DOCUMENTS 8,380,828 B1 * 2/2013 Schlichter et al. ............ 709/221
8,537,667 B2 * 9/2013 Yamazaki et al. ............ 370/230
(Continued)

FOREIGN PATENT DOCUMENTS

| JP | 2006-310900 | 11/2006 |
| JP | 2008-193206 | 8/2008 |
| JP | 2011-10279 | 1/2011 |
| WO | 2009/125470 A1 | 10/2009 |

OTHER PUBLICATIONS

Yasushi Kashiwabara, Kigyo o Atsuku suru Saishin Technology LLDP (IEEE 802.1AB), Nikkei Communications, 5 Gatsu 1 Nichi Go, May 1, 2007, No. 485, pp. 68 to 72.
International Search Report from International Application No. PCT/JP2011/053932, Mailed Jun. 7, 2011.

Primary Examiner — Hong Cho
(74) Attorney, Agent, or Firm — Brundidge & Stanger, P.C.

(57) ABSTRACT

A network management system which can easily rebuild the system even when a switch in the configuration of cars occurs. A monitor apparatus including monitor cameras (1-1~1-4, ...) and recording devices (1-5, ...) in each car (21a, 21b, ...) is networked. Each intra-car network is constructed as a LAN, a router (1-10 (RT1), ...) is connected to the LAN in each car, and an inter-car network is constructed as a WAN. The same apparatus in each car and apparatuses provided at the same positions are connected to a port of the same port number and the same LAN address is allocated to such an apparatus. As for an access from a WAN side, which apparatus is accessed is defined only by a difference in port number. Network information of the car switched car can be set merely by switching the setting of the WAN address of the router, . . . .

4 Claims, 17 Drawing Sheets

(56) References Cited

U.S. PATENT DOCUMENTS

| | | | |
|---|---|---|---|
| 2005/0220036 A1* | 10/2005 | Sugitani et al. | 370/252 |
| 2006/0140174 A1* | 6/2006 | Yeom | 370/352 |
| 2006/0209822 A1* | 9/2006 | Hamamoto et al. | 370/389 |
| 2006/0268861 A1* | 11/2006 | Sonoda et al. | 370/389 |
| 2008/0089246 A1* | 4/2008 | Ghanwani et al. | 370/256 |

* cited by examiner

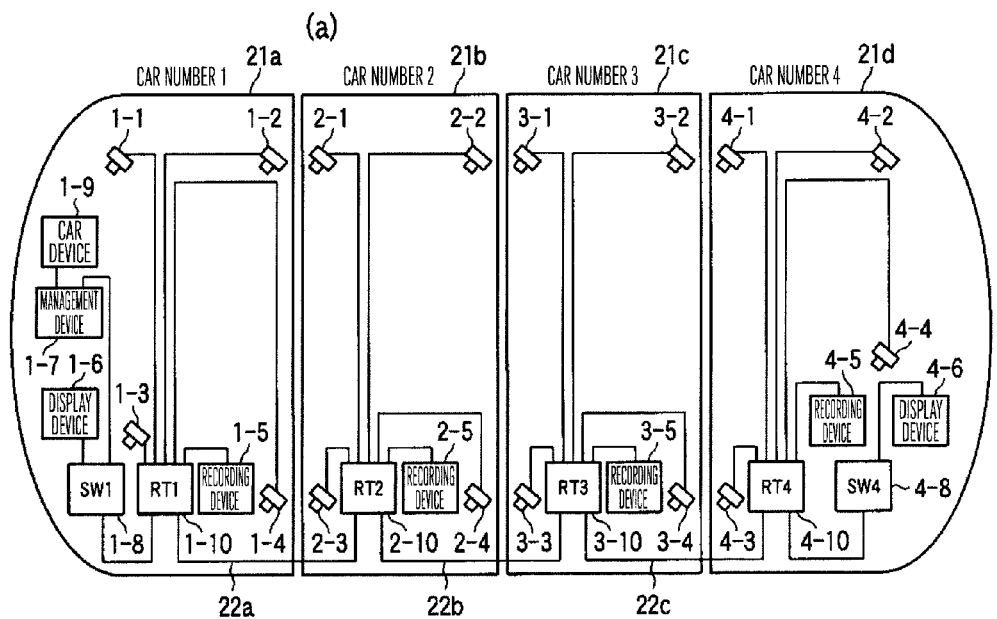

FIG.1C (c) 21b

| CAR NUMBER 2 | |
|---|---|
| DEVICE NAME | IP ADDRESS |
| CAMERA 2-1 | 192.168.1.100 |
| CAMERA 2-2 | 192.168.1.101 |
| CAMERA 2-3 | 192.168.1.102 |
| CAMERA 2-4 | 192.168.1.103 |
| RECORDING DEVICE 2-5 | 192.168.1.120 |
| ROUTER 2-10 (RT2) | 10.1.1.11 |

FIG.1D (d) 21c

| CAR NUMBER 3 | |
|---|---|
| DEVICE NAME | IP ADDRESS |
| CAMERA 3-1 | 192.168.1.100 |
| CAMERA 3-2 | 192.168.1.101 |
| CAMERA 3-3 | 192.168.1.102 |
| CAMERA 3-4 | 192.168.1.103 |
| RECORDING DEVICE 3-5 | 192.168.1.120 |
| ROUTER 3-10 (RT3) | 10.1.1.12 |

FIG.1E (e) 21d

| CAR NUMBER 4 | |
|---|---|
| DEVICE NAME | IP ADDRESS |
| CAMERA 4-1 | 192.168.1.100 |
| CAMERA 4-2 | 192.168.1.101 |
| CAMERA 4-3 | 192.168.1.102 |
| CAMERA 4-4 | 192.168.1.103 |
| RECORDING DEVICE 4-5 | 192.168.1.120 |
| DISPLAY DEVICE 4-6 | 10.1.1.202 |
| ROUTER 4-10 (RT4) | 10.1.1.13 |
| SWITCH 4-8 (SW4) | — |

FIG.3A (a)

CAR NUMBER 1 ROUTER (RT1) NAPT TABLE 31a

| IP ADDRESS: PORT NUMBER (ROUTER WAN SIDE) | IP ADDRESS: PORT NUMBER (DISPLAY DEVICE SIDE) | DESTINATION MAC ADDRESS | IP ADDRESS: PORT NUMBER (ROUTER LAN SIDE) | DESTINATION MAC ADDRESS |
|---|---|---|---|---|
| 10.1.1.10:80 | 10.1.1.201:5000 | MAg | 192.168.1.100:80 | MA1-1 |
| 10.1.1.10:81 | 10.1.1.201:5555 | MAg | 192.168.1.101:80 | MA1-2 |
| 10.1.1.10:82 | 10.1.1.201:5670 | MAg | 192.168.1.102:80 | MA1-3 |
| 10.1.1.10:83 | 10.1.1.201:6000 | MAg | 192.168.1.103:80 | MA1-4 |
| 10.1.1.10:92 | 10.1.1.201:8000 | MAg | 192.168.1.120:80 | MA1-5 |
| 10.1.1.10:93 | 10.1.1.201:10000 | MAg | 192.168.1.120:2000 | MA1-5 |
| ... | ... | ... | ... | ... |

FIG.3B (b)

CAR NUMBER 2 ROUTER (RT2) NAPT TABLE 31b

| IP ADDRESS: PORT NUMBER (ROUTER WAN SIDE) | IP ADDRESS: PORT NUMBER (DISPLAY DEVICE SIDE) | DESTINATION MAC ADDRESS | IP ADDRESS: PORT NUMBER (ROUTER LAN SIDE) | DESTINATION MAC ADDRESS |
|---|---|---|---|---|
| 10.1.1.11:80 | 10.1.1.201:8000 | MAg | 192.168.1.100:80 | MA2-1 |
| 10.1.1.11:81 | 10.1.1.201:8555 | MAg | 192.168.1.101:80 | MA2-2 |
| 10.1.1.11:82 | 10.1.1.201:8670 | MAg | 192.168.1.102:80 | MA2-3 |
| 10.1.1.11:83 | 10.1.1.201:7000 | MAg | 192.168.1.103:80 | MA2-4 |
| 10.1.1.11:92 | 10.1.1.201:9000 | MAg | 192.168.1.120:80 | MA2-5 |
| 10.1.1.11:93 | 10.1.1.201:12000 | MAg | 192.168.1.120:2000 | MA2-5 |
| ... | ... | ... | ... | ... |

FIG.3C (c)

CAR NUMBER 3 ROUTER (RT3) NAPT TABLE 31c

| IP ADDRESS: PORT NUMBER (ROUTER WAN SIDE) | IP ADDRESS: PORT NUMBER (DISPLAY DEVICE SIDE) | DESTINATION MAC ADDRESS | IP ADDRESS: PORT NUMBER (ROUTER LAN SIDE) | DESTINATION MAC ADDRESS |
|---|---|---|---|---|
| 10.1.1.12:80 | 10.1.1.201:7000 | MAg | 192.168.1.100:80 | MA3-1 |
| 10.1.1.12:81 | 10.1.1.201:7555 | MAg | 192.168.1.101:80 | MA3-2 |
| 10.1.1.12:82 | 10.1.1.201:7670 | MAg | 192.168.1.102:80 | MA3-3 |
| 10.1.1.12:83 | 10.1.1.201:9000 | MAg | 192.168.1.103:80 | MA3-4 |
| 10.1.1.12:92 | 10.1.1.201:6000 | MAg | 192.168.1.120:80 | MA3-5 |
| 10.1.1.12:93 | 10.1.1.201:13000 | MAg | 192.168.1.120:2000 | MA3-5 |
| ... | ... | ... | ... | ... |

FIG.3D (d)

CAR NUMBER 4 ROUTER (RT4) NAPT TABLE — 31d

| IP ADDRESS: PORT NUMBER (ROUTER WAN SIDE) | IP ADDRESS: PORT NUMBER (DISPLAY DEVICE SIDE) | DESTINATION MAC ADDRESS | IP ADDRESS: PORT NUMBER (ROUTER LAN SIDE) | DESTINATION MAC ADDRESS |
|---|---|---|---|---|
| 10.1.1.13:80 | 10.1.1.201:5430 | MAg | 192.168.1.100:80 | MA4-1 |
| 10.1.1.13:81 | 10.1.1.201:6780 | MAg | 192.168.1.101:80 | MA4-2 |
| 10.1.1.13:82 | 10.1.1.201:7654 | MAg | 192.168.1.102:80 | MA4-3 |
| 10.1.1.13:83 | 10.1.1.201:9000 | MAg | 192.168.1.103:80 | MA4-4 |
| 10.1.1.13:92 | 10.1.1.201:8500 | MAg | 192.168.1.120:80 | MA4-5 |
| 10.1.1.13:93 | 10.1.1.201:12500 | MAg | 192.168.1.120:2000 | MA4-5 |
| ... | ... | ... | ... | ... |
|  |  |  |  |  |

FIG.4A (a)

| CAR NUMBER 1 ||
|---|---|
| DEVICE NAME | IP ADDRESS |
| ROUTER 1-10 (RT1) | 10.1.1.10 |
| DISPLAY DEVICE 1-6 | 10.1.1.201 |
| MANAGEMENT DEVICE 1-7 | 10.1.1.200 |

FIG.4B (b)

| CAR NUMBER 2 ||
|---|---|
| DEVICE NAME | IP ADDRESS |
| ROUTER 2-10 (RT2) | 10.1.1.11 |

FIG.4C (c)

| CAR NUMBER 3 ||
|---|---|
| DEVICE NAME | IP ADDRESS |
| ROUTER 3-10 (RT3) | 10.1.1.12 |

FIG.4D (d)

| CAR NUMBER 4 | |
|---|---|
| DEVICE NAME | IP ADDRESS |
| ROUTER 4-10 (RT4) | 10.1.1.13 |
| DISPLAY DEVICE 4-6 | 10.1.1.202 |

FIG.4E (e)

| COMMON TO EACH CAR | |
|---|---|
| DEVICE NAME | WAN SIDE PORT NUMBER |
| FRONT-1 DOOR CAMERA | 80 |
| REAR-1 DOOR CAMERA | 81 |
| FRONT-2 DOOR CAMERA | 82 |
| REAR-2 DOOR CAMERA | 83 |
| RECORDING DEVICE | 92 |
| VIDEO OF RECORDING DEVICE | 93 |
| ... | ... |

FIG.4F (f)

| | INTER-CAR ROUTER COUPLING TABLE (32) | | | INTRA-CAR DEVICE TABLE (33) | | |
|---|---|---|---|---|---|---|
| CAR NUMBER | ROUTER INFORMATION | ROUTER IP ADDRESS | ROUTER MAC ADDRESS | DEVICE INFORMATION | IP ADDRESS | MAC ADDRESS |
| 1 | RT1 | 10.1.1.10 | 00-01-02-03-04-01 | MANAGEMENT INFORMATION<br>DISPLAY INFORMATION | 10.1.1.200<br>10.1.1.201 | 00-01-02-08-07-01<br>00-01-02-08-07-02 |
| 2 | RT2 | 10.1.1.11 | 00-01-02-03-04-02 | – | – | – |
| 3 | RT3 | 10.1.1.12 | 00-01-02-03-04-03 | – | – | – |
| 4 | RT4 | 10.1.1.13 | 00-01-02-03-04-04 | DISPLAY INFORMATION | 10.1.1.202 | 00-01-02-08-07-03 |
| 5 | – | – | – | – | – | – |
| 6 | – | – | – | – | – | – |
| ... | ... | ... | ... | ... | ... | ... |

FIG.6A (a)

| CAR NUMBER 1 ||
|---|---|
| DEVICE NAME | IP ADDRESS |
| ROUTER 1-10 (RT1) | 10.1.1.10 |
| DISPLAY DEVICE 1-6 | 10.1.1.201 |
| MANAGEMENT DEVICE 1-7 | 10.1.1.200 |

FIG.6B (b)

| CAR NUMBER 2 ||
|---|---|
| DEVICE NAME | IP ADDRESS |
| ROUTER 2-10 (RT2) | 10.1.1.11 |

FIG.6C (c)

| ~~CAR NUMBER 3~~ ||
|---|---|
| ~~DEVICE NAME~~ | ~~IP ADDRESS~~ |
| ~~ROUTER 3-10 (RT3)~~ | ~~10.1.1.12~~ |

⟷

(c')

| ALTERNATIVE CAR NUMBER 5 ||
|---|---|
| DEVICE NAME | IP ADDRESS |
| ROUTER 5-10 (RT5) | 10.1.1.14 |

FIG.6D (d)

| CAR NUMBER 4 ||
|---|---|
| DEVICE NAME | IP ADDRESS |
| ROUTER 4-10 (RT4) | 10.1.1.13 |
| DISPLAY DEVICE 4-6 | 10.1.1.202 |

FIG.6E (e)

| COMMON TO EACH CAR ||
|---|---|
| DEVICE NAME | WAN SIDE PORT NUMBER |
| FRONT-1 DOOR CAMERA | 80 |
| REAR-1 DOOR CAMERA | 81 |
| FRONT-2 DOOR CAMERA | 82 |
| REAR-2 DOOR CAMERA | 83 |
| RECORDING DEVICE | 92 |
| VIDEO OF RECORDING DEVICE | 93 |
| ... | ... |

(f)

| CAR NUMBER | INTER-CAR ROUTER COUPLING TABLE (32) | | | INTRA-CAR DEVICE TABLE (33) | | |
|---|---|---|---|---|---|---|
| | ROUTER INFORMATION | ROUTER IP ADDRESS | ROUTER MAC ADDRESS | DEVICE INFORMATION | IP ADDRESS | MAC ADDRESS |
| 1 | RT1 | 10.1.1.10 | 00-01-02-03-04-01 | MANAGEMENT INFORMATION | 10.1.1.200 | 00-01-02-08-07-01 |
| | | | | DISPLAY INFORMATION | 10.1.1.201 | 00-01-02-08-07-02 |
| 2 | RT2 | 10.1.1.11 | 00-01-02-03-04-02 | — | — | — |
| 3 | RT3 | 10.1.1.12 | 00-01-02-03-04-03 | — | — | — |
| 4 | RT4 | 10.1.1.13 | 00-01-02-03-04-04 | DISPLAY INFORMATION | 10.1.1.202 | 00-01-02-08-07-03 |
| 5 | — | — | — | — | — | — |
| 6 | — | — | — | — | — | — |
| ... | ... | ... | ... | ... | ... | ... |

FIG.7B (b)

| MANAGEMENT DEVICE ARP TABLE | | | ~34 |
|---|---|---|---|
| IP ADDRESS | MAC ADDRESS | TYPE | |
| 10.1.1.10 | 00-01-02-03-04-01 (RT1_MAC ADDRESS) | dynamic | |
| 10.1.1.11 | 00-01-02-03-04-02 | dynamic | |
| 10.1.1.12 | 00-01-02-03-04-03 | dynamic | |
| 10.1.1.13 | 00-01-02-03-04-04 | dynamic | |
| 10.1.1.14 | 00-01-02-03-04-05 | dynamic | |
| 10.1.1.201 | 00-01-02-08-07-02 | dynamic | |
| 10.1.1.202 | 00-01-02-08-07-03 | dynamic | |
| ... | ... | ... | |

| CAR NUMBER 1   ROUTER (RT1) LLDP ADJACENT DEVICE INFORMATION | | | | | |
|---|---|---|---|---|---|
| PRESENT DEVICE PORT NUMBER | THE NUMBER OF ADJACENT DEVICES | ADJACENT DEVICE SYSTEM INFORMATION | ADJACENT DEVICE MAC ADDRESS | ADJACENT DEVICE PORT INFORMATION | ADJACENT DEVICE IP ADDRESS |
| Port 0/1 | 2 | MANAGEMENT DEVICE | 00-01-02-08-07-01 | GigabitEther 0/1 | 10.1.1.200 |
|  |  | DISPLAY DEVICE | 00-01-02-08-07-02 | GigabitEther 0/1 | 10.1.1.201 |
| Port 0/2 | 1 | RT2 | 00-01-02-03-04-02 | GigabitEther 0/1 | 10.1.1.11 |

| CAR NUMBER 2   ROUTER (RT2) LLDP ADJACENT DEVICE INFORMATION | | | | | |
|---|---|---|---|---|---|
| PRESENT DEVICE PORT NUMBER | THE NUMBER OF ADJACENT DEVICES | ADJACENT DEVICE SYSTEM INFORMATION | ADJACENT DEVICE MAC ADDRESS | ADJACENT DEVICE PORT INFORMATION | ADJACENT DEVICE IP ADDRESS |
| Port 0/1 | 2 | RT1 | 00-01-02-03-04-01 | GigabitEther 0/2 | 10.1.1.10 |
| Port 0/2 | 1 | RT3 | 00-01-02-03-04-03 | GigabitEther 0/1 | 10.1.1.12 |

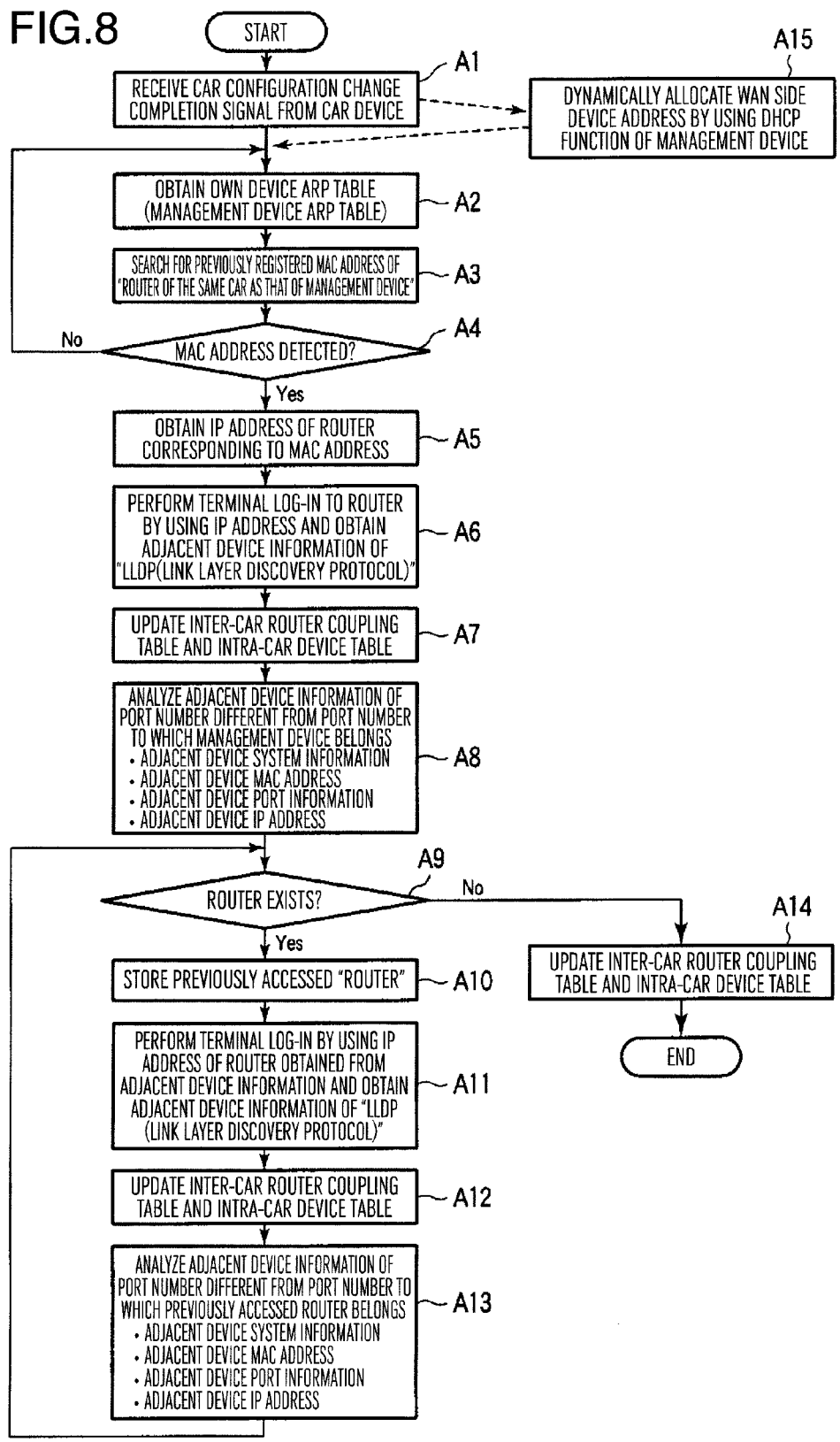

FIG.10C (c)　　　11b

| CAR NUMBER 2 ||
|---|---|
| DEVICE NAME | IP ADDRESS |
| CAMERA 2A-1 | 192.168.1.106 |
| CAMERA 2A-2 | 192.168.1.107 |
| CAMERA 2A-3 | 192.168.1.108 |
| CAMERA 2A-4 | 192.168.1.109 |
| RECORDING DEVICE 2A-5 | 192.168.1.110 |
| SWITCH 2A-8 (SW2) | — |

FIG.10D (d)　　　11c

| CAR NUMBER 3 ||
|---|---|
| DEVICE NAME | IP ADDRESS |
| CAMERA 3A-1 | 192.168.1.111 |
| CAMERA 3A-2 | 192.168.1.112 |
| CAMERA 3A-3 | 192.168.1.113 |
| CAMERA 3A-4 | 192.168.1.114 |
| RECORDING DEVICE 3A-5 | 192.168.1.115 |
| SWITCH 3A-8 (SW3) | — |

FIG.10E (e)　　　11d

| CAR NUMBER 4 ||
|---|---|
| DEVICE NAME | IP ADDRESS |
| CAMERA 4A-1 | 192.168.1.116 |
| CAMERA 4A-2 | 192.168.1.117 |
| CAMERA 4A-3 | 192.168.1.118 |
| CAMERA 4A-4 | 192.168.1.119 |
| RECORDING DEVICE 4A-5 | 192.168.1.120 |
| DISPLAY DEVICE 4A-6 | 192.168.1.121 |
| SWITCH 4A-8 (SW4) | — |

| CAR NUMBER 1 | |
|---|---|
| DEVICE NAME | IP ADDRESS |
| CAMERA 1A-1 | 192.168.1.100 |
| CAMERA 1A-2 | 192.168.1.101 |
| CAMERA 1A-3 | 192.168.1.102 |
| CAMERA 1A-4 | 192.168.1.103 |
| RECORDING DEVICE 1A-5 | 192.168.1.104 |
| DISPLAY DEVICE 1A-6 | 192.168.1.105 |
| MANAGEMENT DEVICE 1A-7 | 192.168.1.200 |
| SWITCH 1A-8 (SW1) | − |

FIG.11C (c)

| CAR NUMBER 2 | |
|---|---|
| DEVICE NAME | IP ADDRESS |
| CAMERA 2A-1 | 192.168.1.106 |
| CAMERA 2A-2 | 192.168.1.107 |
| CAMERA 2A-3 | 192.168.1.108 |
| CAMERA 2A-4 | 192.168.1.109 |
| RECORDING DEVICE 2A-5 | 192.168.1.110 |
| SWITCH 2A-8 (SW2) | — |

FIG.11D (d)

| CAR NUMBER 3 | |
|---|---|
| DEVICE NAME | IP ADDRESS |
| CAMERA 3A-1 | 192.168.1.111 |
| CAMERA 3A-2 | 192.168.1.112 |
| CAMERA 3A-3 | 192.168.1.113 |
| CAMERA 3A-4 | 192.168.1.114 |
| RECORDING DEVICE 3A-5 | 192.168.1.115 |
| SWITCH 3A-8 (SW3) | — |

(f)

| CAR NUMBER 5 | |
|---|---|
| DEVICE NAME | IP ADDRESS |
| CAMERA 5A-1 | 192.168.1.122 |
| CAMERA 5A-2 | 192.168.1.123 |
| CAMERA 5A-3 | 192.168.1.124 |
| CAMERA 5A-4 | 192.168.1.125 |
| RECORDING DEVICE 5A-5 | 192.168.1.126 |
| SWITCH 5A-8 (SW5) | — |

FIG.11E (e)

| CAR NUMBER 4 | |
|---|---|
| DEVICE NAME | IP ADDRESS |
| CAMERA 4A-1 | 192.168.1.116 |
| CAMERA 4A-2 | 192.168.1.117 |
| CAMERA 4A-3 | 192.168.1.118 |
| CAMERA 4A-4 | 192.168.1.119 |
| RECORDING DEVICE 4A-5 | 192.168.1.120 |
| DISPLAY DEVICE 4A-6 | 192.168.1.121 |
| SWITCH 4A-8 (SW4) | — |

FIG.11F (g)

| CAR NUMBER 5 | |
|---|---|
| DEVICE NAME | IP ADDRESS |
| CAMERA 5A-1 | 192.168.1.111 |
| CAMERA 5A-2 | 192.168.1.112 |
| CAMERA 5A-3 | 192.168.1.113 |
| CAMERA 5A-4 | 192.168.1.114 |
| RECORDING DEVICE 5A-5 | 192.168.1.115 |
| SWITCH 5A-8 (SW5) | — | ical Field

The present invention relates to a monitor system which has monitor devices such as monitor cameras, recording devices, and the like in railway cars, monitors a video of a situation in the car, and records video data into the recording devices and, more particularly, to a network management system which can easily rebuild the system even when a construction of a network is changed by "a switch in the configuration of cars", "a change of the number of cars of one configuration", or the like and to an internetworking unit.

NETWORK MANAGEMENT SYSTEM AND INTERNETWORKING UNIT

INCORPORATION BY REFERENCE

The present application claims priority from Japanese Patent Application JP-2010-073440 filed on Mar. 26, 2010, the content of which is hereby incorporated by reference into this application.

TECHNICAL FIELD

The present invention relates to a monitor system which has monitor devices such as monitor cameras, recording devices, and the like in railway cars, monitors a video of a situation in the car, and records video data into the recording devices and, more particularly, to a network management system which can easily rebuild the system even when a construction of a network is changed by "a switch in the configuration of cars", "a change of the number of cars of one configuration", or the like and to an internetworking unit.

BACKGROUND ART

In recent years, a network management system of a monitor form which has monitor cameras, video recording devices, network switches, and video display devices in railway cars, monitors a video of a situation in the car, and records video data into the recording devices has been operated.

FIGS. 10A to 10E show an operating method of a network management system in the related art for monitoring and recording a video in a car by using monitor cameras, video recording devices, network switches, and video display devices in railway cars. (a) in FIG. 10A is a schematic constructional diagram of a monitor system in cars of a 4-car configuration constructed by a car 11a of a car number 1 to a car 11d of a car number 4. (b) to (e) in FIGS. 10B to 10E are diagrams showing construction tables of the cars 11a to 11d, respectively.

The monitor system of the car 11a of the car number 1 is constructed by, for example, monitor cameras 1A-1 to 1A-4, a recording device 1A-5, a display device 1A-6, a management device 1A-7, a network switch 1A-8 (SW1), and a car device 1A-9.

The monitor system of the car 11b of the car number 2 is constructed by monitor cameras 2A-1 to 2A-4, a recording device 2A-5, and a network switch 2A-8 (SW2).

The monitor system of the car 11c of the car number 3 is constructed by monitor cameras 3A-1 to 3A-4, a recording device 3A-5, and a network switch 3A-8 (SW3).

The monitor system of the car 11d of the car number 4 is constructed by monitor cameras 4A-1 to 4A-4, a recording device 4A-5, and a network switch 4A-8 (SW4).

The four monitor cameras provided for the cars 11a to 11d monitor, for example, regions near a front-1 door, a front-2 door, a rear-1 door, and a rear-2 door, respectively.

According to the monitor systems of the cars 11a to 11d, the network switches 1A-8 (SW1), 2A-8 (SW2), 3A-8 (SW3), and 4A-8 (SW4) are connected by signal lines 12a, 12b, and 12c, respectively.

As for an IP address of each device in the cars 11a to 11d, it is assumed that the addresses have unconditionally been allocated by a network group of, for example, "192.168.1.0/24" as shown in the construction table of (b) in FIG. 10B.

The management device 1A-7 provided for the car 11a previously manages the addresses of the monitor cameras, the recording devices, and the display devices of one configuration (the cars 11a to 11d) by a database.

In the case where a carman of the head car 11a or the last car 11d confirms a live video of the monitor camera of an arbitrary car by using the display devices 1A-6 and 4A-6, he designates "car number", "camera name or the like", and the like and makes a selection. At this time, by using the database managed by the management device 1A-7, each of the display devices 1A-6 and 4A-6 allows the carman to discriminate the IP address of the target monitor camera from "car number" and "camera name or the like", is networked to the target monitor camera by the IP address, obtains the live video, and displays the video to a display unit of its own device.

In the case where the carman confirms the recorded video of the monitor camera of an arbitrary car by the display devices 1A-6 and 4A-6, he designates not only "car number" and "camera name or the like" but also "time/date of the recorded video", "reproduction control of the recorded video", and the like and makes a selection. By using the database managed by the management device 1A-7, each of the display devices 1A-6 and 4A-6 allows the carman to discriminate the IP addresses of the recording devices 1A-5 to 4A-5 which recorded the video of the target monitor camera from "car number" and "camera name or the like", is networked to the target monitor camera by the IP addresses, obtains the recorded video, and displays the video to a display unit of its own device.

As a related art regarding the invention, there has been known such a technique that in order to allow a central monitor center to concentratedly monitor image monitor targets existing in a wide area, a plurality of devices at monitoring positions are grouped and connected by a LAN (Local Area Network), and further, a plurality of groups are connected by a WAN (Wide Area Network), thereby monitoring (for example, refer to Patent Literature 1).

CITATION LIST

Patent Literature

Patent Literature 1: JP-A-2006-310900

SUMMARY OF INVENTION

Technical Problem

In the foregoing monitor system in the railway cars, there are "a switch in the configuration of cars", "a change of the number of cars of one configuration", and the like as operation forms of the railway cars and, at this time, such a problem that it takes trouble and time to reset network apparatus information occurs.

FIGS. 11A to 11F show a case where "a switch in the configuration of cars" occurred.

It is assumed that one configuration is in a state of a 4-car configuration constructed by the car 11a of the car number 1 to the car 11d of the car number 4 in a manner similar to the case of FIGS. 10A to 10E and the addresses of the monitor cameras, the recording devices, and the display devices of the one configuration (the cars 11a to 11d) are previously managed in a database by the management device 1A-7. As for the IP address of each device, it is assumed that the addresses have unconditionally been allocated by the network group of, for example, "192.168.1.0/24" as shown in the construction tables of (b) to (e) in FIGS. 11B to 11E.

From this state, the car 11c of the car number 3 is switched to an alternative car 11e of a car number 5. The alternative car 11e is equipped with monitor cameras 5A-1 to 5A-4, a recording device 5A-5, and a network switch 5A-8 (SW5) in a manner similar to the car 11c. An IP address has been allocated to each device as shown in a construction table of (f) in FIG. 11D. In the case of assembling the cars into the configuration of cars while maintaining those addresses, there occurs such a troublesomeness that a database setting change has to be performed so that the IP address of each device allocated to the switched car 11c (car number 3) in the database which has previously been managed by the management device 1A-7 is changed to the IP address of each device of the alternative car 11e.

In the case where the carman does not want to take the troublesomeness for changing the settings of the database of the management device 1A-7, there occurs such a troublesomeness that a setting change has to be performed so that the IP address of each device of the alternative car 11e is previously changed to an IP address similar to the IP address of each device in the car 11c of the car number 3 as shown in (g) in FIG. 11F before assembling the cars into the configuration of cars.

FIG. 12 shows a case where "a change of the number of cars of one configuration" occurred.

It is assumed that one configuration is in a state of a 4-car configuration constructed by the car 11a of the car number 1 to the car 11d of the car number 4 in a manner similar to the case of FIGS. 10A to 10E and the addresses of the monitor cameras, the recording devices, and the display devices of one configuration (the cars 11a to 11d) are previously managed in the database by the management device 1A-7.

It is assumed that the car 11e of the car number 5 to a car 11h of a car number 8 are assembled into the configuration from this state. Even in the cars 11e to 11h which are assembled into the configuration, a monitor system constructed by monitor cameras, recording devices, and display devices, and the like is provided in a manner similar to the cars 11a to 11d. The network switches 4A-8 (SW4), 5A-8 (SW5), 6A-8 (SW6), 7A-8 (SW7), and 8A-8 (SW8) of the cars 11d, 11e, 11f, 11g, and 11h are connected by signal lines 12d, 12e, 12f, and 12g, respectively.

Even in the case of changing the number of cars of one configuration as mentioned above, there occurs such a troublesomeness that the setting change has to be performed so that the IP address of each device of the additional cars 11e to 11h is changed to that in the database in a manner similar to the case of "a switch in the configuration of cars" mentioned above.

Although it seems that there will be no problem on operation of the monitor system if the troublesomeness for the setting change is permitted, a possibility of occurrence of the problem on the operation of the railway cars occurs here. The problem on the operation of the railway cars is such a request that even in the case where "a switch in the configuration of cars" or "a change of the number of cars of one configuration" occurred, a system recovery is performed in a short time (within a few minutes).

In the case where "a switch in the configuration of cars" has preliminarily been scheduled or a pattern of "a change of the number of cars of one configuration" has been determined, it is possible to cope with such a case by previously making the setting of the IP address of each device in each car. However, such a method is difficult on the actual operation.

There occurs such a necessity that the setting change of the database of the management device 1A-7 is performed each time "a switch in the configuration of cars" and "a change of the number of cars of one configuration" occurs. If the setting change is performed, such a request that the system recovery is performed within a few minutes is not satisfied.

The invention is made to solve the above problems and it is an object to provide a network management system which can easily rebuild the system even when a construction of a network is changed by "a switch in the configuration of cars", "a change of the number of cars of one configuration", or the like in a system for managing a plurality of networks and to provide an internetworking unit.

Solution to Problem

According to the first aspect of the invention, there is provided a network management system comprising: an internetworking unit for connecting networks; a management device for managing a global address of the internetworking unit; a first network constructed by the internetworking unit and one or more network apparatuses; and a second network constructed by at least the management device and the internetworking unit, characterized in that the network apparatus of a same condition is connected to a port of a same port number of the internetworking unit and sets a same private address every the first network, and communication is performed by using the private address and the port number which are allocated to the network apparatus of the first network, the management device of the second network, and the global address which is allocated to the internetworking unit.

According to the second aspect of the invention, there is provided the network management system characterized in that the management device has: means for accessing the internetworking unit and forming a table of adjacent apparatus information of an apparatus adjacent to the internetworking unit obtained by an LLDP function installed in each of the internetworking units; and means for discriminating the presence or absence of the internetworking unit connected to the port other than the accessed port of the internetworking unit from the obtained adjacent apparatus information, and in the case where the internetworking unit is connected to the port other than the accessed port, the adjacent apparatus information of the internetworking unit is obtained, and the table is updated.

According to the third aspect of the invention, there is provided an internetworking unit comprising at least two or more ports, characterized in that when an LLDP communication command is received, a bridge setting between the predetermined ports is made so as not to perform a routing of the LLDP communication command from the port on the received side to the other port which has been bridge-set.

According to the fourth aspect of the invention, there is provided the network management system according to the first and second inventions, characterized in that the management device has a DHCP server function, and an address is automatically allocated to the newly added internetworking unit by the DHCP server function.

Advantageous Effects of Invention

According to the invention, even in the case where the first network was switched on a network unit basis or the number of networks was changed, the system can be operated without performing a registration change of the addresses of the apparatuses constructing the network. Therefore, for example, in the case where the invention is embodied to the network management system in which the monitor devices including the monitor cameras are connected by the network every car, even if "a switch in the configuration of cars" or "a change of the number of cars of one configuration" occurred, there is no need to perform the registration change of the addresses of the apparatuses. There is such an effect that a registering operation in the operation of the network system can be simplified and, at the same time, a time restriction for the system recovery on the business operation of the railway cars is satisfied. A registering operation in a terminal switching operation due to a failure switch or the like of the railway cars becomes unnecessary, a risk of the stop of the system operation due to an erroneous registering operation can be preliminarily suppressed, and a reduction in down-time of the system operation can be realized.

Other objects, features, and advantages of the present invention will be apparent from the disclosure of the following embodiments of the invention regarding the accompanying drawings.

BRIEF DESCRIPTION OF DRAWINGS

FIG. 1A is a constructional diagram of a network management system according to an embodiment 1 of the invention.

FIG. 1B is a diagram showing a system construction table of a car of a car number 1 according to the embodiment 1.

FIG. 1C is a diagram showing a system construction table of a car of a car number 2 according to the embodiment 1.

FIG. 1D is a diagram showing a system construction table of a car of a car number 3 according to the embodiment 1.

FIG. 1E is a diagram showing a system construction table of a car of a car number 4 according to the embodiment 1.

FIG. 3A is an explanatory diagram showing a setting of an NAPT (Network Address Port Translation) for performing a setting to a router which is installed to the car of the car number 1 in the network management system according to the embodiment 1.

FIG. 3B is an explanatory diagram showing a setting of an NAPT (Network Address Port Translation) for performing a setting to a router which is installed to the car of the car number 2 in the network management system according to the embodiment 1.

FIG. 3C is an explanatory diagram showing a setting of an NAPT (Network Address Port Translation) for performing a setting to a router which is installed to the car of the car number 3 in the network management system according to the embodiment 1.

FIG. 3D is an explanatory diagram showing a setting of an NAPT (Network Address Port Translation) for performing a setting to a router which is installed to the car of the car number 4 in the network management system according to the embodiment 1.

FIG. 4A is an explanatory diagram showing a method of previously managing addresses of a router and a display device of one configuration by a database in the network management system according to the embodiment 1.

FIG. 4B is another explanatory diagram of the method of FIG. 4A.

FIG. 4C is further another explanatory diagram of the method of FIG. 4A.

FIG. 4D is still another explanatory diagram of the method of FIG. 4A.

FIG. 4E is an explanatory diagram showing a method of managing access port numbers from a router WAN side by a database in place of managing the addresses of the monitor cameras and the recording devices of each car in the network management system according to the embodiment 1.

FIG. 4F is a diagram showing an example of an inter-car router coupling table and an intra-car device table which are used in the network management system according to the embodiment 1.

FIG. 6A is an explanatory diagram showing a database managing method at the time of a switch in a configuration of cars in the network management system according to the embodiment 1.

FIG. 6B is another explanatory diagram showing the database managing method of FIG. 6A.

FIG. 6C is further another explanatory diagram showing the database managing method of FIG. 6A.

FIG. 6D is still another explanatory diagram showing the database managing method of FIG. 6A.

FIG. 6E is still another explanatory diagram showing the database managing method of FIG. 6A.

FIG. 7B is another explanatory diagram showing the database managing method of FIG. 7A.

FIG. 7C is further another explanatory diagram showing the database managing method of FIG. 7A.

FIG. 7D is still another explanatory diagram showing the database managing method of FIG. 7A.

FIG. 8 is an explanatory diagram showing a database managing flow using the LLDP function in the router at the time of a switch in a configuration of cars in the network management system according to the embodiment 2.

FIG. 10C is further another explanatory diagram showing the network management system of FIG. 10A.

FIG. 10D is still another explanatory diagram showing the network management system of FIG. 10A.

FIG. 10E is still another explanatory diagram showing the network management system of FIG. 10A.

FIG. 11C is further another explanatory diagram showing the system operation of FIG. 11A.

FIG. 11D is still another explanatory diagram showing the system operation of FIG. 11A.

FIG. 11E is still another explanatory diagram showing the system operation of FIG. 11A.

FIG. 11F is still another explanatory diagram showing the system operation of FIG. 11A.

DESCRIPTION OF EMBODIMENTS

Figure 2:
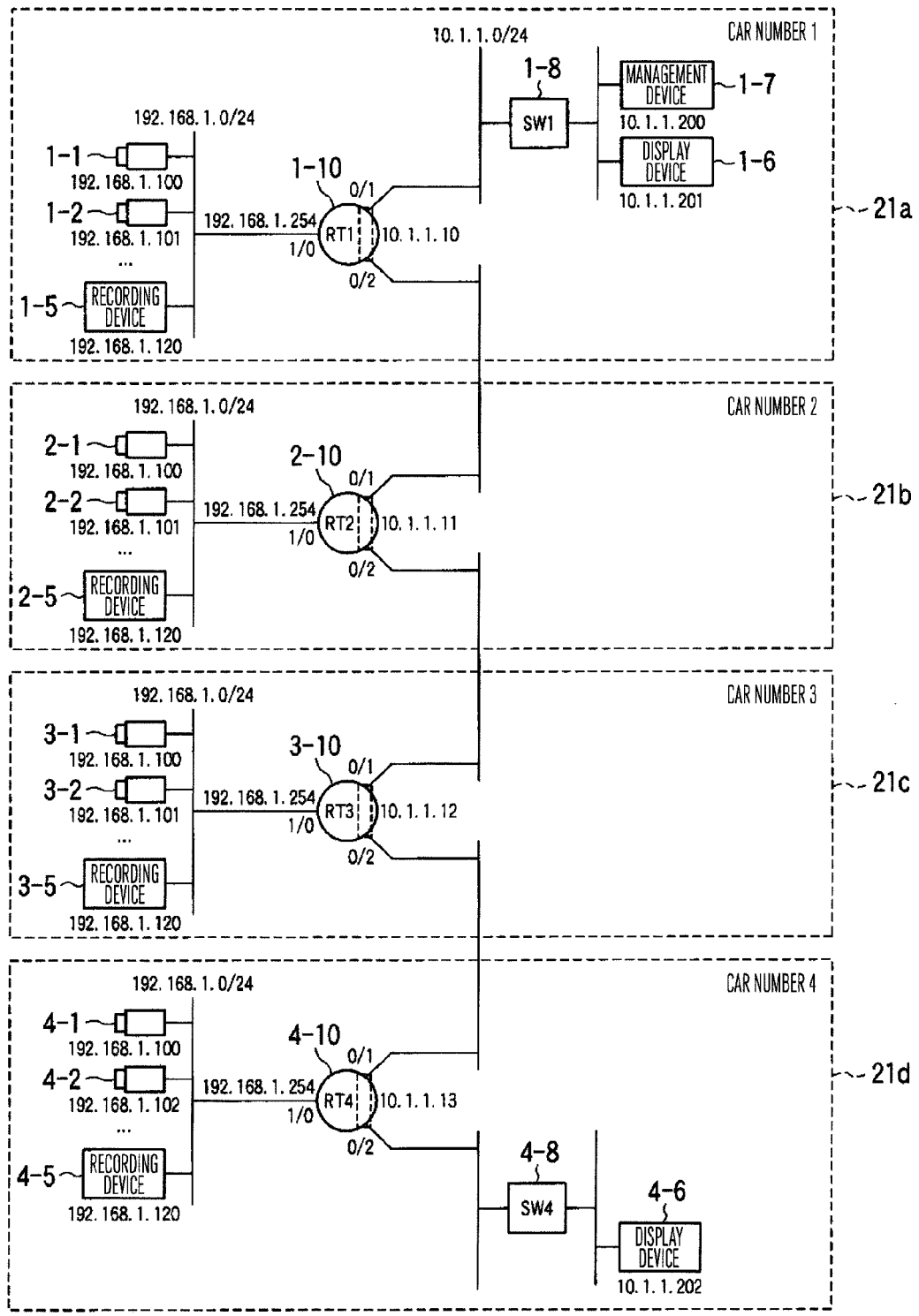
FIG. 2 is an explanatory diagram showing that an inter-car network is configured as a WAN and an address allocation is performed to monitor cameras and recording devices by a network group of a LAN in the network management system according to the embodiment 1.

Embodiments of the invention will be described in detail hereinbelow.

Embodiment 1

FIGS. 1A to 1E show a construction of a network management system according to an embodiment 1 of the invention. (a) in FIG. 1A is a schematic constructional diagram of a monitor system in cars of a 4-car configuration constructed by a car 21*a* of a car number 1 to a car 21*d* of a car number 4. (b) to (e) in FIGS. 1B to 1E are diagrams showing construction tables of the cars 21*a* to 21*d*, respectively.

The monitor system of the car 21*a* of the car number 1 is constructed by, for example, four monitor cameras 1-1 to 1-4, a recording device 1-5, a display device 1-6, a management device 1-7, a network switch 1-8 (SW1), and a network router 1-10 (RT 1) (internetworking unit) for connecting a car device 1-9 and networks. The monitor cameras 1-1 to 1-4 and the recording device 1-5 are connected to the router 1-10 and the display device 1-6 and the management device 1-7 are connected thereto through the network switch 1-8. The management device 1-7 is connected to the car device 1-9.

The monitor system of the car 21*b* of the car number 2 is constructed by monitor cameras 2-1 to 2-4, a recording device 2-5, and a router 2-10 (RT2). The monitor cameras 2-1 to 2-4 and the recording device 2-5 are connected to the router 2-10.

The monitor system of the car 21*c* of the car number 3 is constructed by monitor cameras 3-1 to 3-4, a recording device 3-5, and a network router 3-10 (RT3). The monitor cameras 3-1 to 3-4 and the recording device 3-5 are connected to the router 3-10.

The monitor system of the car 21*d* of the car number 4 is constructed by monitor cameras 4-1 to 4-4, a recording device 4-5, a display device 4-6, a network switch 4-8 (SW4), and a network router 4-10 (RT4). The monitor cameras 4-1 to 4-4 and the recording device 4-5 are connected to the router 4-10 and the display device 4-6 is connected thereto through the network switch 4-8.

The four monitor cameras provided for the cars 21*a* to 21*d* monitor, for example, regions near a front-1 door, a front-2 door, a rear-1 door, and a rear-2 door, respectively.

As mentioned above, in the monitor system of the cars 21*a* to 21*d*, the devices are groups and connected by the LAN every car.

The routers 1-10 to 4-10 of the cars 21*a* to 21*d* are connected by signal lines 22*a* to 22*c*. A plurality of groups which were grouped every car are connected by the WAN. In this case, the same apparatuses of the cars 21*a* to 21*d* and the apparatuses provided at the same positions are connected to the ports of the same port number and the same LAN address (private address) is allocated to them. As for an access from a router WAN side, which apparatus is accessed is defined only by a difference in port number, thereby enabling the network information of the change cars to be set merely by changing the allocation of the WAN addresses of the router.

That is, as for an IP address of each device in the cars 21*a* to 21*d*, as shown in the construction tables of (b) to (e) in FIGS. 1B to 1E and an explanatory diagram of an address allocation in FIG. 2, in the routers 1-10 to 4-10 which are installed every car, an inter-car network is configured as a WAN (10.1.1.0/24) and an address allocation is performed to the monitor cameras and the recording devices by a network group of a LAN (192.168.1.0/24).

It should be noted here that when the address allocation is performed to the monitor cameras 1-1 to 1-4, 2-1 to 2-4, 3-1 to 3-4, and 4-1 to 4-4 and the recording devices 1-5 to 4-5 of the cars 21*a* to 21*d* by the network group of the LAN (192.168.1.0/24), as for the access from the router WAN side, which apparatus is accessed is defined only by the difference in port number. Therefore, there is no need to consciously allocate the different addresses in each of the cars 21*a* to 21*d*. In the case of considering an efficiency of maintenance, it is also effective to use such an operation that the same LAN address is allocated to the cameras at the same camera position (front-1 door, front-2 door, rear-1 door, and rear-2 door) in each of the cars 21*a* to 21*d* and the same LAN address is also allocated to the recording devices 1-5 to 4-5 in each of the cars 21*a* to 21*d*. It is also assumed that the inter-car network is configured as a WAN (10.1.1.0/24) and the addresses are unconditionally allocated to the routers 1-10 to 4-10, the management device 1-7, and the display devices 1-6 and 4-6, respectively.

Subsequently, router NAPT (Network Address Port Translation) tables 31*a* to 31*d* for making a setting to the routers 1-10 to 4-10 installed in the cars 21*a* to 21*d* are shown in (a) to (d) in FIGS. 3A to 3D.

"IP address: port number (router WAN side)" is registered into the first column of each of the router NAPT tables 31*a* to 31*d* and "IP address: port number (router LAN side)" is registered into the fourth column.

It should be noted here that when an access is performed from the WAN side to the monitor cameras 1-1 to 1-4, 2-1 to 2-4, 3-1 to 3-4, and 4-1 to 4-4 and the recording devices 1-5 to 4-5, in the access to the router WAN side, which device is accessed is defined only by the difference in port number. The same port number is allocated to the cameras at the same camera position (front-1 door, front-2 door, rear-1 door, and rear-2 door) in each of the cars 21*a* to 21*d* and the same port number is also allocated to the recording devices 1-5 to 4-5 in each of the cars 21*a* to 21*d*.

In the router NAPT tables 31*a* to 31*d*, in correspondence to "IP address: port number (router WAN side)" in the first column, "IP address: port number (display device side)" is registered into the second column and "destination MAC (Media Access Control) address" is registered into the third column, and in correspondence to "IP address: port number (router LAN side)" in the fourth column, "destination MAC address" is registered into the fifth column. However, they are dynamically registered into the second, third, and fifth columns at the time of operation of the network.

As shown in (a) to (d) in FIGS. 4A to 4D, the management device 1-7 previously manages addresses (global addresses) of the routers 1-10 (RT1), 2-10 (RTZ), 3-10 (RT3), and 4-10 (RT4) and the display devices 1-6 and 4-6 of one configuration by the database. In place of managing the addresses of the monitor cameras and the recording devices of the cars 21*a* to 21*d*, the access port numbers from the router WAN side are managed by the database as shown in (e) in FIG. 4E.

(f) in FIG. 4F shows an inter-car router coupling table 32 and an intra-car device table 33. The inter-car router coupling table 32 manages the router information, router IP addresses, and router MAC addresses in the cars 21*a*, 21*b*, 21*c*, and 21*d*. The intra-car device table 33 manages the IP addresses and MAC addresses in the cars 21*a*, 21*b*, 21*c*, and 21*d*. Although the MAC addresses are managed in the inter-car router coupling table 32 and the intra-car device table 33 shown in (f) in FIG. 4F, if only the IP addresses are known, since each apparatus can be accessed from the management device 1-7, the MAC addresses are not always necessary.

In the case where the carman confirms live videos of the monitor cameras of an arbitrary car by using the display devices 1-6 and 4-6, he designates "car number", "camera name or the like", and the like and makes a selection. By using the database managed by the management device 1-7, each of the display devices 1-6 and 4-6 allows the carman to discriminate the router IP address and the port number for accessing the target monitor camera from "car number" and "camera name or the like". Each of the display devices 1-6 and 4-6 is networked to the target monitor camera on the basis of the discriminated address and port number, obtains the live video, and displays the video to the display unit of its own device.

A specific example is now shown. In the case where the carman of the car 21a confirms the live video of the monitor camera 1-2 (rear-1 door camera) by the display device 1-6, the display device 1-6 derives "IP address (10.1.1.10)" and "WAN port number 81" of the router 1-10 (RT1) from "car number 1" and "rear-1 door camera or the like" by using the databases managed by the management device 1-7 and shown in FIGS. 4A to 4F. As "10.1.1.10:81", the display device 1-6 accesses the WAN side of the router 1-10 (RT1) by the address and the port number. The router 1-10 (RT1) performs a routing to "192.168.1.101:80" for the device accessed to "10.1.1.10:81" in accordance with the router (TRT1) NAPT table 31a shown in FIG. 3A, thereby connecting the network to the target monitor camera 1-2 (rear-1 door camera), obtains the live video, and displays the video to the display device of its own device.

In the case where the carman of the car 21a confirms the recorded video of the monitor camera of an arbitrary car by using the display device 1-6, he designates not only "car number" and "camera name or the like" but also "time/date of the recorded video", "reproduction control of the recorded video", and the like and makes a selection. By using the database managed by the management device 1-7, the display device 1-6 allows the carman to discriminate the router IP address and the port number for accessing the target recording device from "car number", is networked to the target recording device by the discriminated address and port number, and obtains a recording camera information list. In the case of considering an efficiency of a processing time, there will be no problem even if the recording camera information list is preliminarily obtained. From the recording camera information list and "camera name or the like", "recording channel number" of the relevant monitor camera may be discriminated. The display device 1-6 is networked to the target recording device by the discriminated address, "recording channel number", "time/date of the recorded video", "reproduction control of the recorded video", and the like, obtains the recorded video, and displays the recorded video to the display device of its own device.

Figure 5:
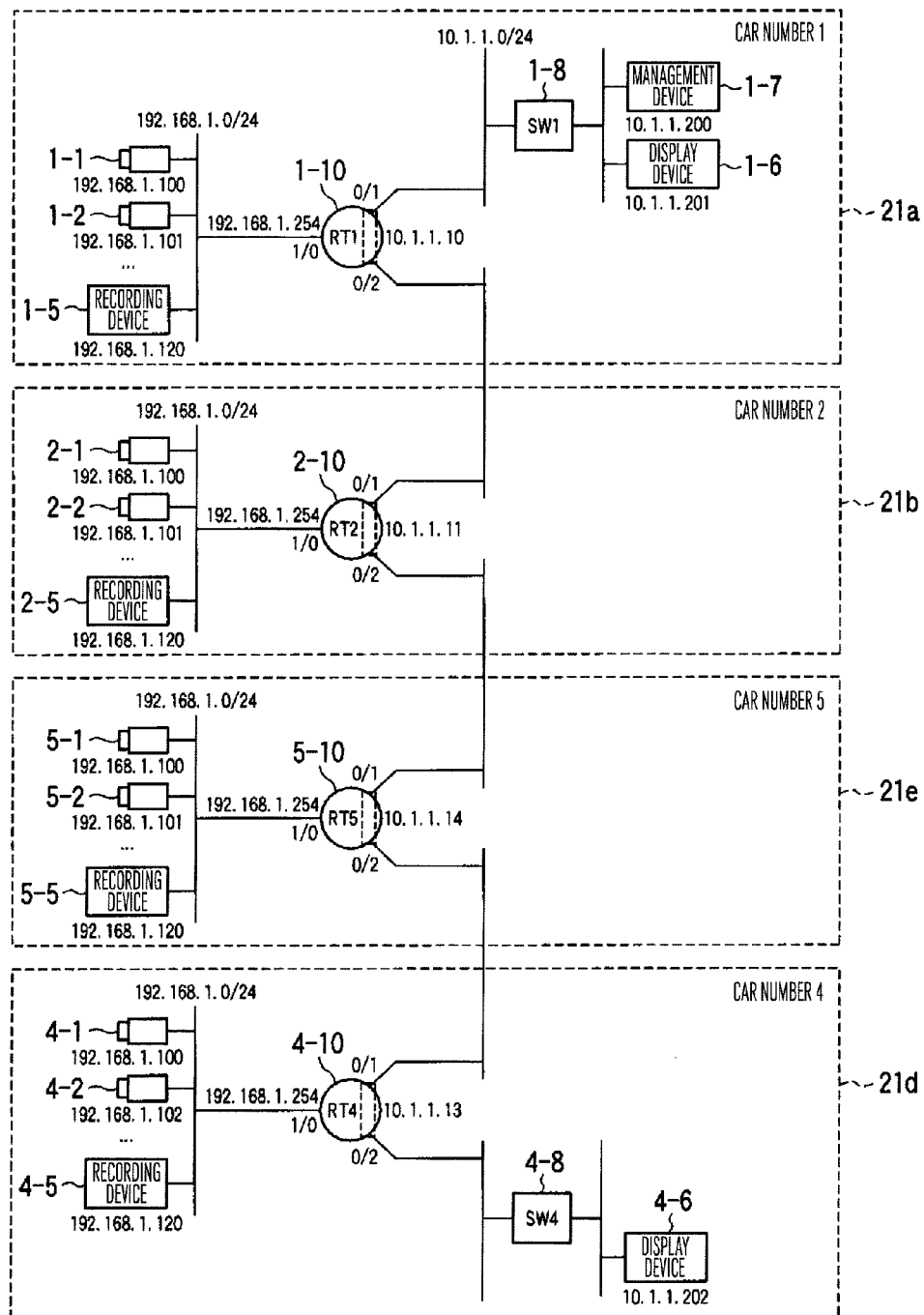
FIG. 5 is an explanatory diagram showing a system operation at the time of a switch in a configuration of cars in the network management system according to the embodiment 1.

FIG. 5 shows a case, as an example, where "a switch in the configuration of cars" occurred and a case where the car 21c of the car number 3 is switched to the alternative car 21e of the alternative car number 5.

Monitor cameras 5-1 to 5-4 and a recording device 5-5 are provided for the alternative car 21e in a manner similar to the switched car 21c. However, as shown in construction tables of FIGS. 6A to 6F, the IP address (10.1.1.12) of the router 3-10 (RT3) allocated in the car 21c of the car number 3 in the database which has previously been managed by the management device 1-7 is merely changed to the IP address (10.1.1.14) of the router 5-10 (RT5) of the alternative car 21e (alternative car number 5). If the carman does not want to take a troublesomeness for changing the setting of the database of the management device 1-7, the switch in the configuration of cars can be performed merely by preliminarily performing the setting change from the IP address (10.1.1.14) of the router 5-10 (RT5) of the alternative car 21e to the IP address (10.1.1.12) of the router 3-10 (RT3).

As mentioned above, in the case of performing "a switch in the configuration of cars", the address allocation of only the routers is merely set without considering the address allocation of the monitor cameras and the recording device provided for each car. Therefore, the troublesomeness such as a setting or the like is reduced and not only a simplification of the registering operation in the operation of the network system can be realized but also the time restriction of the system recovery on the railway car business operation can be satisfied. The registering operation in the terminal switching operation due to a failure switch or the like of the railway cars becomes unnecessary, and a reduction of the down-time of the system operation can be realized.

Even if "a change of the number of cars of one configuration" occurred, the troublesomeness such as a setting or the like can be reduced in a manner similar to the case of performing "a switch in the configuration of cars" mentioned above.

As mentioned above, in the case of performing "a switch in the configuration of cars" or "a change of the number of cars of one configuration", it is sufficient to merely set the address allocation of only the routers without considering the address allocation of the monitor cameras and the recording device provided for each car and the troublesomeness such as a setting or the like can be reduced.

Embodiment 2

Subsequently, a network management system according to an embodiment 2 of the invention will be described.

The embodiment 2 shows a system in which in the case where "a switch in the configuration of cars" or "a change of the number of cars of one configuration" occurred, an automatic update setting of the database which has previously been managed by the management device 1-7 can be performed.

FIGS. 7A to 7D are explanatory diagrams showing a database managing method using an LLDP (Link Layer Discovery Protocol) function in a router at the time of a switch in a configuration of cars in the network management system according to the embodiment 2 of the invention.

FIG. 8 is a flowchart showing a database managing flow using the LLDP (Link Layer Discovery Protocol) function in the router at the time of a switch in a configuration of cars in the network management system according to the embodiment 2 of the invention.

Figures 6F, 7A:
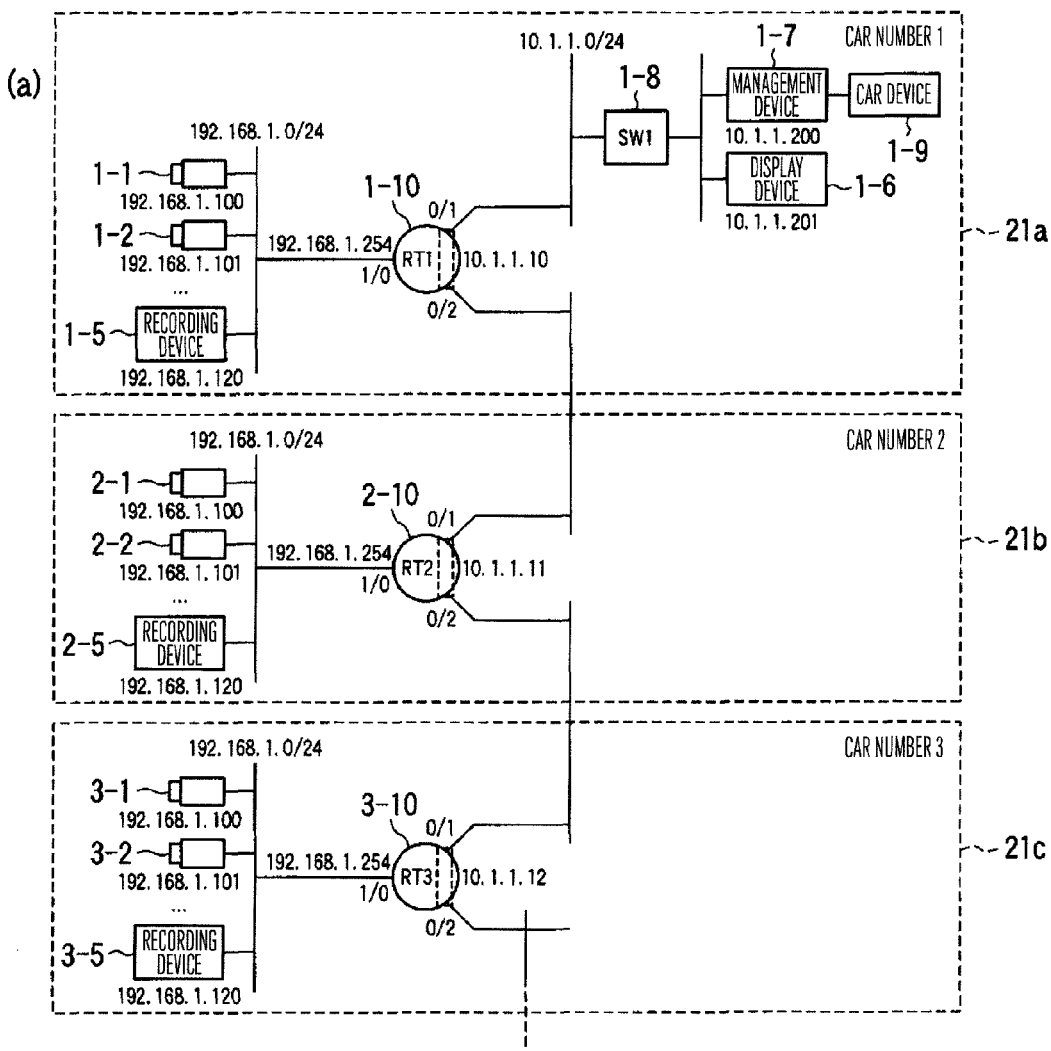
FIG. 6F is still another explanatory diagram showing the database managing method of FIG. 6A.
FIG. 7A is an explanatory diagram showing a database managing method using an LLDP (Link Layer Discovery Protocol) function in a router at the time of a switch in a configuration of cars in a network management system according to an embodiment 2 of the invention.

As shown in (a) in FIG. 7A, it is assumed that in the network routers 1-10 (RT1), 2-10 (RT2), and 3-10 (RT3) which are installed in each of the cars 21a, 21b, and 21c, an inter-car network is configured as a WAN (10.1.1.0/24) and an operation is performed to the monitor cameras and the recording devices by the network group of the LAN (192.168.1.0/24).

The LLDP (Link Layer Discovery Protocol) function has been installed in the routers 1-10 (RT1), 2-10 (RT2), and 3-10 (RT3) of the cars 21a, 21b, and 21c. The WAN side has at least two or more physical ports and has such a feature that a bridge setting can be made to arbitrary WAN side physical ports among them. Further, in addition to such a feature, the routers 1-10 (RT1), 2-10 (RT2), and 3-10 (RT3) have such a feature that in the case where an LLDP communication command has reached the bridge-set WAN side physical ports, it is received only in the relevant WAN side physical port and it is abandoned without performing the routing to the bridge-set WAN side physical ports.

If "a switch in the configuration of cars" was executed, as shown in the flowchart of FIG. 8, when a car configuration change completion signal (notification) is received from the car device 1-9 (step A1), the management device 1-7 obtains an ARP (Address Resolution Protocol) table 34 of its own device shown in (b) in FIG. 7B (step A2). As shown in the ARP table 34, a list of MAC (Media Access Control) addresses and IP addresses of the devices connected to the WAN side is obtained. The management device 1-7 searches the list in the ARP table 34 by using "MAC address of the router 1-10 (RT1) provided for the same car as that of its own device (management device)", as a key, which has previously been registered (step A3) and discriminates whether or not the MAC address could be detected (step A4). If the MAC address cannot be detected, the processing routine is returned to step A2, the ARP table 34 is updated and obtained and the detection of the relevant MAC address is tried by a periodic time loop.

If the relevant MAC address was detected in step A4, the IP address of the corresponding router 1-10 (RT1) is obtained from the list in the ARP table 34 (step A5). A terminal log-in is performed to the relevant router by using the obtained IP address of the corresponding router 1-10 (RT1) and the adjacent device information of the LLDP (Link Layer Discovery Protocol) is obtained (step A6).

As shown in tables 35a and 35b of the router (RT1) LLDP adjacent device information shown in (c) and (d) in FIGS. 7C and 7D, information such as "the number of adjacent devices", "adjacent device system information", "adjacent device MAC address", "adjacent device port information", "adjacent device IP address", and the like of the devices connected there can be obtained every physical port number of the router.

Figure 9:
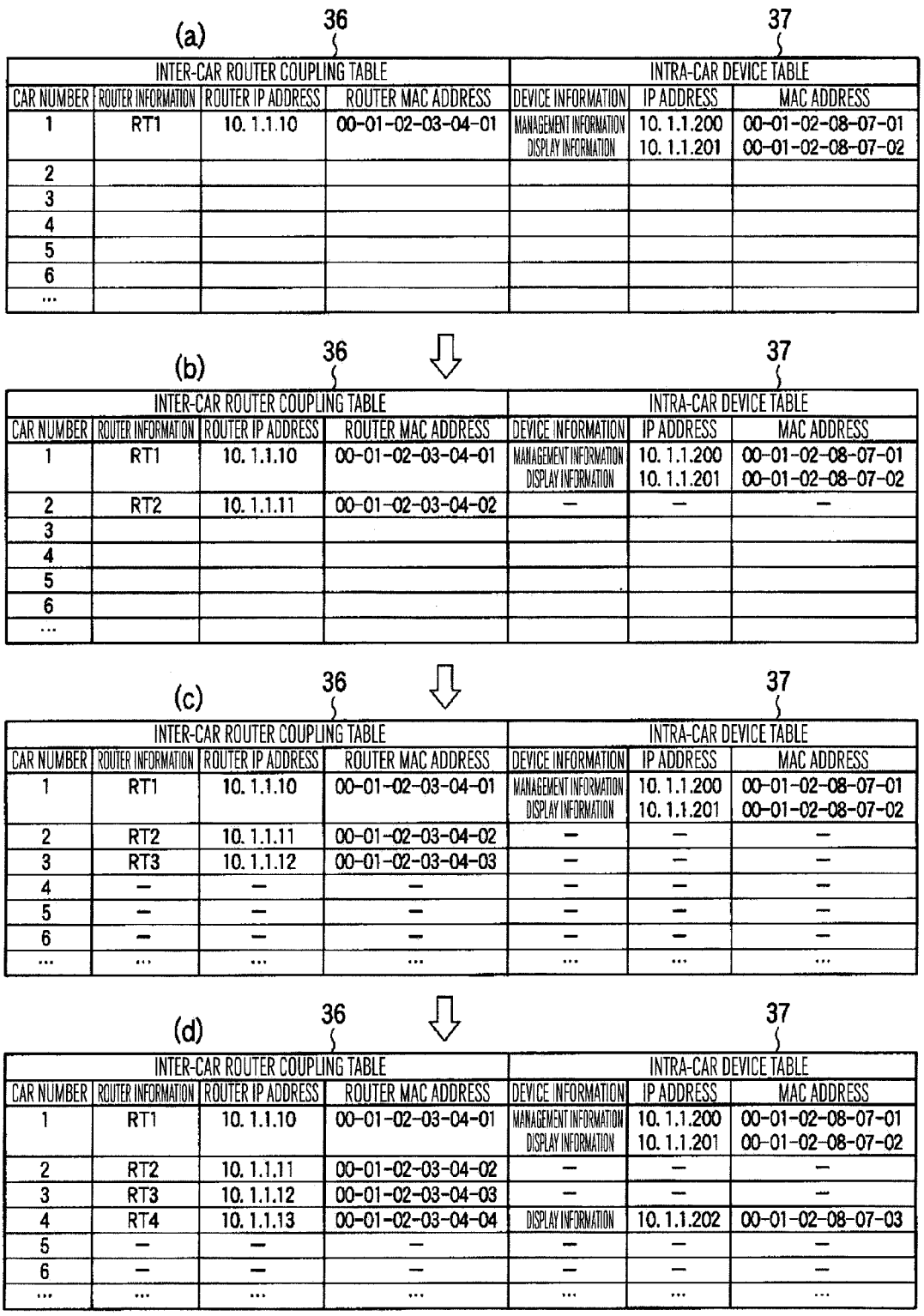
FIG. 9 is an explanatory diagram showing an updating method of an inter-car router coupling table and an intra-car device table using the LLDP function in the router at the time of a switch in a configuration of cars in the network management system according to the embodiment 2.
Figures 10A, 10B:
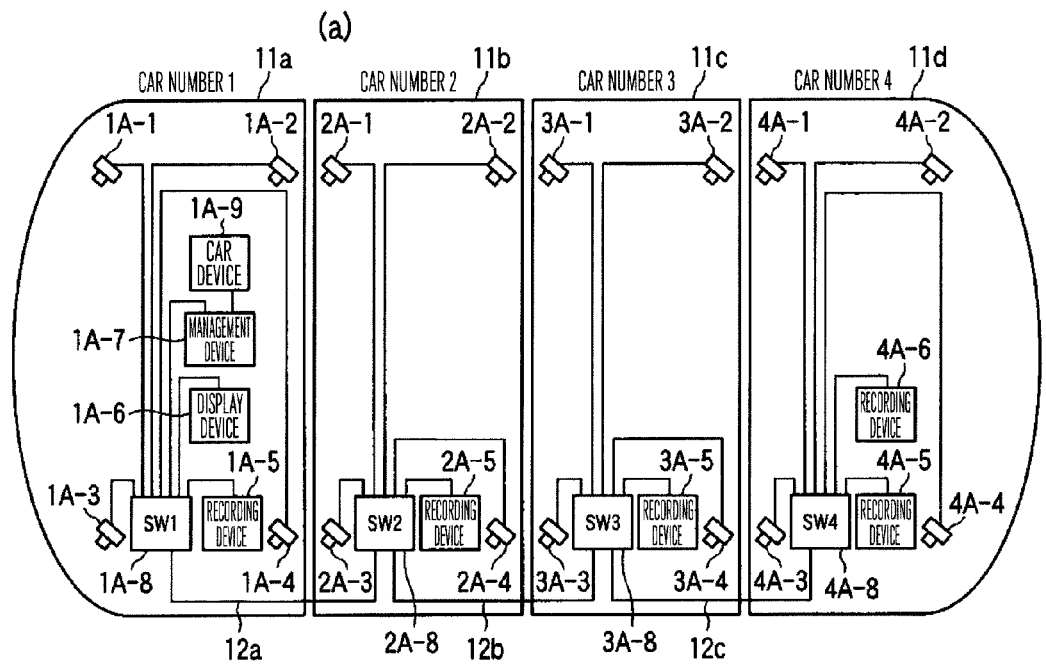
FIG. 10A is an explanatory diagram showing a network management system in the related art.
FIG. 10B is another explanatory diagram showing the network management system of FIG. 10A.
Figures 11A, 11B:
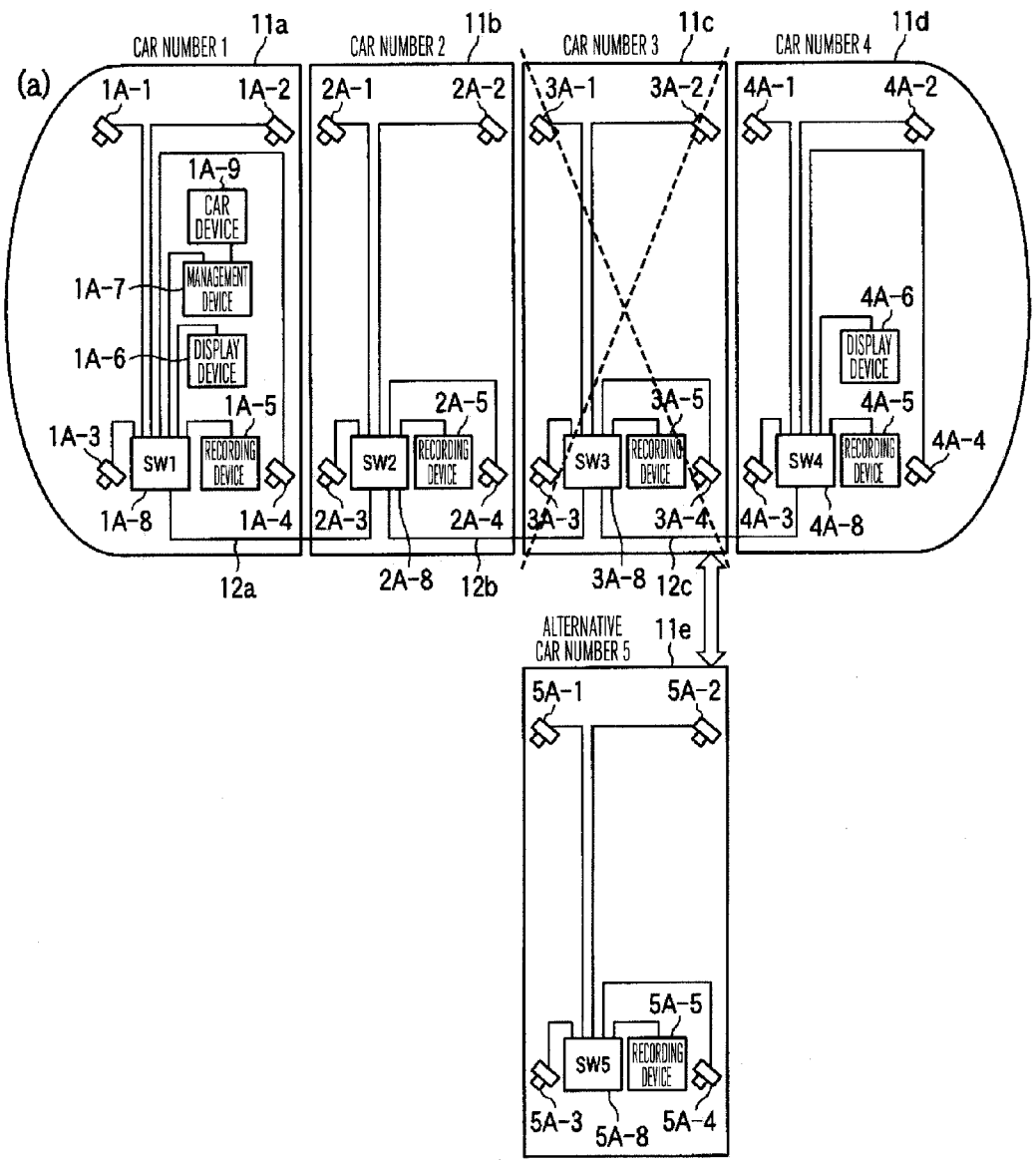
FIG. 11A is an explanatory diagram showing a system operation at the time of a switch in a configuration of cars in the network management system in the related art.
FIG. 11B is another explanatory diagram showing the system operation of FIG. 11A.
Figure 12:
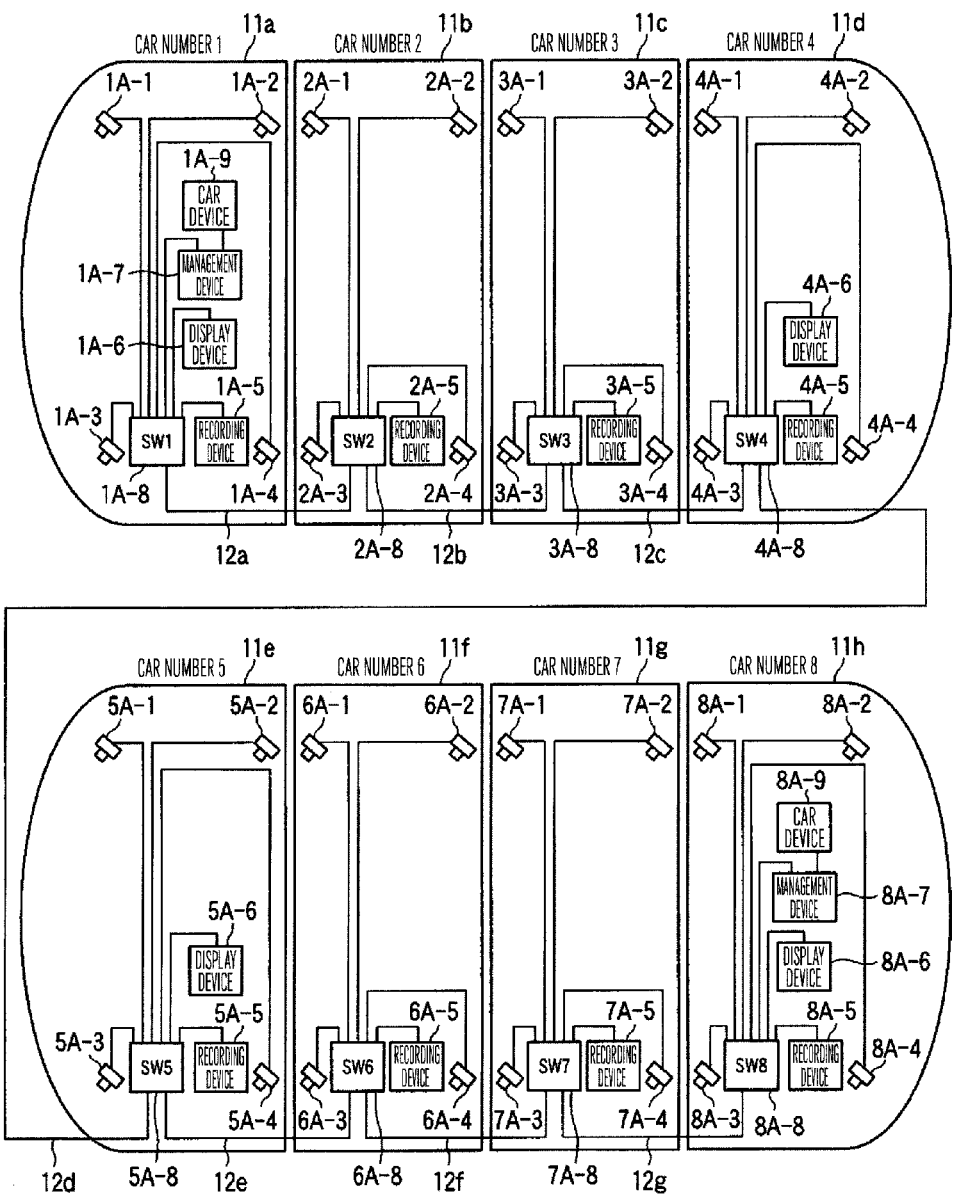
FIG. 12 is an explanatory diagram showing a system operation at the time of a change of the number of cars of one configuration in the network management system in the related art.

The management device 1-7 is provided with an inter-car router coupling table 36 and an intra-car device table 37 shown in FIG. 9 and updates the tables from the obtained adjacent device information (step A7). Adjacent device information of a physical port number different from the physical port number to which the management device 1-7 of the router 1-10 belongs is analyzed from the adjacent device information (step A8). Whether or not the router exists in the adjacent device information of the relevant physical port number is discriminated (step A9). If the existence of the router was detected in step A9, the router 1-10 (RT1) which is accessed at present is stored (step A10).

A terminal log-in is performed to the relevant router by using the IP address of the router 2-10 (RT2) obtained by the adjacent device IP address information and adjacent device information of the LLDP (Link Layer Discovery Protocol) is obtained (step A11). In a manner similar to that mentioned above, the inter-car router coupling table 36 and the intra-car device table 37 are updated (step A12). Adjacent device information of the physical port number different from the physical port number to which the previously-accessed router 1-10 (RT1) stored in step A10 of the router 2-10 belongs is analyzed (step A13). Whether or not the router exists in the adjacent device information of the relevant physical port number is discriminated (step A9). In this manner, the processes of steps A9 to A13 are repetitively executed and if the existence of the router cannot be detected, that is, if it is determined in step A9 that the router is not connected, the inter-car router coupling table 36 and the intra-car device table 37 are updated (step A14). The processing routine is finished.

If the WAN side addresses cannot be previously unconditionally allocated as a supplementary explanation, a DHCP (Dynamic Host Configuration Protocol) server function may be provided for the management device 1-7 and, during the execution of the car configuration change, that is, when the car configuration change completion signal (notification) is received from the car device 1-9 in step A1, the addresses can be also dynamically allocated to the routers 1-10 (RT1), 2-10 (RT2), . . . and the display device 1-6 of the cars 21a, 21b, . . . serving as WAN side devices (step A15). After the process of step A15 was executed, the processing routine advances to step A2 mentioned above.

By executing those processes, in the case where "a switch in the configuration of cars" occurred in FIG. 5 mentioned above, since the relations between the IP addresses of the routers 1-10 (RT1), 2-10 (RT2), 5-10 (RT5), and 4-10 (RT4) provided for the cars 21a, 21b, 21e, and 21d and the car positions are automatically reflected to the database of the management device 1-7, the troublesomeness such as a setting or the like is reduced and not only the simplification of the registering operation in the operation of the network system can be realized but also the time restriction of the system recovery on the railway car business operation can be satisfied. In addition, since the registering operation in the terminal switching (adding) operation accompanied with the railway car failure switch, the change of the number of cars of one configuration, or the like is unnecessary, the reduction of the down-time of the system operation can be realized. A risk of the stop of the system operation due to the erroneous registering operation can be also preliminarily suppressed.

The invention is not limited to the foregoing embodiments as they are but, at an embodying stage, it can be embodied by modifying the component elements within a scope without departing from its essence. That is, although the invention has been described above with respect to the embodiments, the invention is not limited to them but, naturally, various changes and modifications are possible within the scope of the spirit and scope of claims of the invention.

REFERENCE SIGNS LIST 1-1~1-4 . . . 4-1~4-4 Monitor camera
1-5~4-5 Recording device
1-6, 4-6 Display device
1-7 Management device
1-8 (SW1), 4-8 (SW4) Network switch
1-9 Car device
1-10 (RT1)~4-10 (RT4), 5-10 (RT5) Network router
21a~21d Car
21e Alternative car
22a~22c Signal line
31a~31d Router NAPT table
31, 32 Inter-car router coupling table
33 Intra-car device table
34 ARP table
35a, 35b Table of router (RT1) LLDP adjacent device information
36 Inter-car router coupling table
37 Intra-car device table

The invention claimed is:
1. A network management system comprising;
an internetworking unit for connecting networks; and
a management device for making network connected apparatus information of an apparatus connected to a network, wherein said management device comprises:

means for accessing said internetworking unit and obtaining adjacent apparatus information of an apparatus adjacent to said internetworking unit by an LLDP (Link Layer Discovery Protocol) function installed in said internetworking unit;

means for updating the network connected apparatus information based on the adjacent apparatus information; and means for discriminating the presence or absence of said internetworking unit connected to a port other than an accessed port of said internetworking unit based on said obtained adjacent apparatus information, and when said internetworking unit is connected to the port other than said accessed port, adjacent apparatus information of said internetworking unit is obtained, and said network connected apparatus information is updated.

2. A network management unit comprising:

means for accessing an internetworking unit and obtaining adjacent apparatus information of an apparatus adjacent to said internetworking unit by an LLDP (Link Layer Discovery Protocol) function installed in said internetworking unit;

means for updating network connected apparatus information based on said obtained adjacent apparatus information; and means for discriminating the presence or absence of said internetworking unit connected to a port other than an accessed port of said internetworking unit based on said obtained adjacent apparatus information, wherein when said internetworking unit is connected to the port other than said accessed port of said internetworking unit, adjacent apparatus information of said internetworking unit is obtained, and said network connected apparatus information is updated.

3. A method of managing a network, the method comprising:

accessing an internetworking unit and obtaining adjacent apparatus information of an apparatus adjacent to said internetworking unit by an LLDP (Link Layer Discovery Protocol) function installed in said internetworking unit;

updating network connected apparatus information based on said obtained adjacent apparatus information;

discriminating the presence or absence of said internetworking unit connected to a port other than an accessed port of said internetworking unit based on said obtained adjacent apparatus information; and when said internetworking unit is connected to the port other than said accessed port of said internetworking unit, obtaining adjacent apparatus information of said internetworking unit, and updating said network connected apparatus information.

4. The method of claim 3, wherein a side of said internetworking unit has at least two physical ports to which a bridge setting can be made, and wherein when an LLDP communication command is issued, the LLDP communication command is received in one of said at least two physical ports, and is abandoned without performing routing to said at least two physical ports to which a bridge has been set.

\* \* \* \* \*